United States Patent
Osaheni et al.

(10) Patent No.: US 8,088,277 B2
(45) Date of Patent: Jan. 3, 2012

(54) METHODS AND SYSTEM FOR REMOVING IMPURITIES FROM HEAVY FUEL

(75) Inventors: John Aibangbee Osaheni, Clifton Park, NY (US); Thomas Joseph Fyvie, Schenectady, NY (US); Gregory Allen O'Neil, Clifton Park, NY (US); Hope Matis, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 12/137,279

(22) Filed: Jun. 11, 2008

(65) Prior Publication Data

US 2009/0308812 A1    Dec. 17, 2009

(51) Int. Cl.
*C10G 25/03*    (2006.01)

(52) U.S. Cl. ............... 208/251 R; 585/820; 585/823

(58) Field of Classification Search .............. None
See application file for complete search history.

(56) References Cited

U.S. PATENT DOCUMENTS

| | | | |
|---|---|---|---|
| 3,055,825 A | 9/1962 | Buningh et al. | |
| 3,996,335 A | 12/1976 | Wolk et al. | |
| 4,152,249 A | 5/1979 | Avrillon et al. | |
| 4,486,298 A * | 12/1984 | Bowes et al. | 208/253 |
| 4,552,735 A | 11/1985 | Iannicelli et al. | |
| 4,812,436 A | 3/1989 | Staal et al. | |
| 4,877,920 A | 10/1989 | Lush et al. | |
| 5,310,717 A | 5/1994 | Delzer et al. | |
| 5,326,385 A | 7/1994 | Rajani et al. | |
| 5,472,613 A | 12/1995 | Schofield | |
| 5,853,579 A | 12/1998 | Rummler et al. | |
| 6,312,528 B1 | 11/2001 | Summerfield et al. | |
| 2004/0118748 A1 | 6/2004 | Lesemann et al. | |
| 2004/0118749 A1 | 6/2004 | Lesemann et al. | |
| 2004/0120875 A1 | 6/2004 | Morton et al. | |
| 2007/0227951 A1 | 10/2007 | Thirugnanasampanthar et al. | |

FOREIGN PATENT DOCUMENTS

| | | |
|---|---|---|
| EP | 0308165 A2 | 3/1989 |
| EP | 0810278 A2 | 12/1997 |
| EP | 1332774 A2 | 8/2003 |
| GB | 1288806 | 9/1972 |
| WO | 2006103404 A1 | 10/2006 |
| WO | 2009002664 A1 | 12/2008 |

OTHER PUBLICATIONS

EP Partial Search Report related to Application No. 09162326.1-1270 dated Oct. 1, 2009.
EP Search Report issued in connection with corresponding EP Application No. 09162326.4, Feb. 22, 2011.

* cited by examiner

*Primary Examiner* — Tam M Nguyen
(74) *Attorney, Agent, or Firm* — Armstrong Teasdale LLP (57) ABSTRACT

A method of removing impurities from heavy fuel includes providing a first stationary adsorption column. The method further includes packing adsorbent particles that have a particle size distribution wherein at least about 50% of the particles have a diameter greater than about 18 microns in the first column. The method further includes diluting heavy fuel with a solvent to form a solvent-fuel mixture, and supplying the solvent-fuel mixture through the first column to facilitate removing impurities from the mixture.

14 Claims, 4 Drawing Sheets

METHODS AND SYSTEM FOR REMOVING IMPURITIES FROM HEAVY FUEL

BACKGROUND OF THE INVENTION

The present invention relates generally to processes for removing impurities from heavy fuel, and more particularly, to methods and systems that remove corrosive metal compound impurities from heavy fuel with the use of a stationary adsorption column.

Hydrocarbon oils represent a type of crude oil (petroleum) found throughout the world, that consists of a complex mixture of hydrocarbons (mostly alkanes). In most cases, the hydrocarbon oils (e.g., the heavy oils) are processed and refined into other useful petroleum products, such as diesel fuel, gasoline, heating oil, kerosene, and liquefied petroleum gas. Such other petroleum products are then used for various industrial purposes, such as for combustion fuel in a gas turbine engine.

It is well known in the art that hydrocarbon oils, like other organic compositions derived prehistorically from nature, contain at least small amounts of contaminating compounds containing metals, sulfur, and other elements and compounds, such as nitrogen. For example, crude oil from regions such as Saudi Arabia often contains relatively high levels of many of these contaminants. Such contaminants are detrimental to the direct use of the hydrocarbon oils as a fuel (e.g., use of the oil with minimal processing), and may be detrimental to the processing of the oil to produce other commercially valuable products.

As an illustration, when used with gas turbine engines, impurities in the fuel cause corrosion to the turbine blades and/or other components. More specifically, vanadium compounds may form hard deposits on turbine blades which may promote corrosion. In addition to material degradation and processing problems in refineries, the presence of contaminants, such as sulfur, may also result in environmental and/or regulatory problems. For such reasons, the operating efficiency of gas turbine engines operating with such fuel oil types may be adversely affected.

Metal contaminants in heavy oil, such as nickel and vanadium, are usually present in the form of one or more organometallic compounds, such as various porphyrinic compounds. The metallic compounds can be present in the form of non-porphyrin metal species as well, e.g., as metal salts. Moreover, other elements which may be present in crude oil include potassium, lead, sodium, and iron.

A number of techniques have been used in an attempt to remove impurities from oil, and/or in an attempt to minimize their harmful effects. In general processes, distillation techniques commonly used in oil refining remove some of the contaminants, as various oil fractions are boiled off in traditional distillation columns. However, such distillation techniques may be very energy-intensive.

Catalytic hydrodesulfurization techniques have been used to remove sulfur from crude products. However, vanadium and nickel impurities that are also present in the oil tend to adhere to the catalysts and thereby block the active site, thus diminishing the efficiency of the desulfurization reactions. Further, this process may be expensive to operate.

Magnesium compounds are sometimes used to address the problems of metal contamination. For example, magnesium is capable of forming relatively low-melting alloys with contaminant metals such as vanadium. Such low-melting compounds can be removed more easily (e.g., by washing) from the surface of turbine blades, as compared to the harder, higher-melting contaminants themselves.

While the use of the magnesium compounds may be suitable in some situations, their use may be limited in some situations. For example, the compounds may form excessively hard deposits if the underlying part (for example, a gas turbine component) is exposed to higher temperatures, e.g., greater than about 2,000° F. (1093° C.). In these situations, deposits remain adhered to the metal surfaces. Thus, the use of such gas turbine components may be limited unnecessarily to lower operating temperatures. Moreover, combustion of the lower-melting magnesium-vanadium alloys can result in the generation of significant amounts of ash, which may form a residue on an underlying substrate, e.g., the turbine blades. Such deposits can also adversely affect the gas flow path over the turbine blades. Furthermore, removing such deposits may require shutting down the turbine.

In view of these concerns, new techniques for reducing the level of metallic or non-metallic impurities in heavy oils are desirable. The improved processes should be capable of substantially reducing the level of at least some of the impurities in the heavy oils in a cost-effective and energy-conservative manner. Moreover, these techniques should not adversely affect other treatment processes to which the heavy oil is subjected.

BRIEF DESCRIPTION OF THE INVENTION

In one aspect, a method of removing impurities from heavy fuel is provided. The method includes providing a first stationary adsorption column and packing adsorbent particles that have a particle size distribution wherein at least about 50% of the particles have a diameter greater than about 18 microns in the first column. The method further includes diluting heavy fuel with a solvent to form a solvent-fuel mixture and supplying the solvent-fuel mixture through the first column to facilitate removing impurities from the mixture.

In another aspect, a method for removing impurities from heavy fuel is provided. The method includes providing a first stationary adsorption column, packing adsorbent particles in the column in a graduated particle orientation such that the smallest particles are positioned at an outlet end of the first column and the largest particles are positioned at a feed end of the first column. The method further includes diluting heavy fuel with a solvent to form a solvent-fuel mixture and directing the solvent-fuel mixture through the first column.

In a further aspect, an adsorption column for the removal of impurities from heavy fuel is provided. The adsorption column includes a stationary column and a plurality of adsorbent particles having a particle size distribution wherein at least 50% of the particles have a diameter greater than about 18 microns packed within the column.

DETAILED DESCRIPTION OF THE INVENTION

Figure 1:
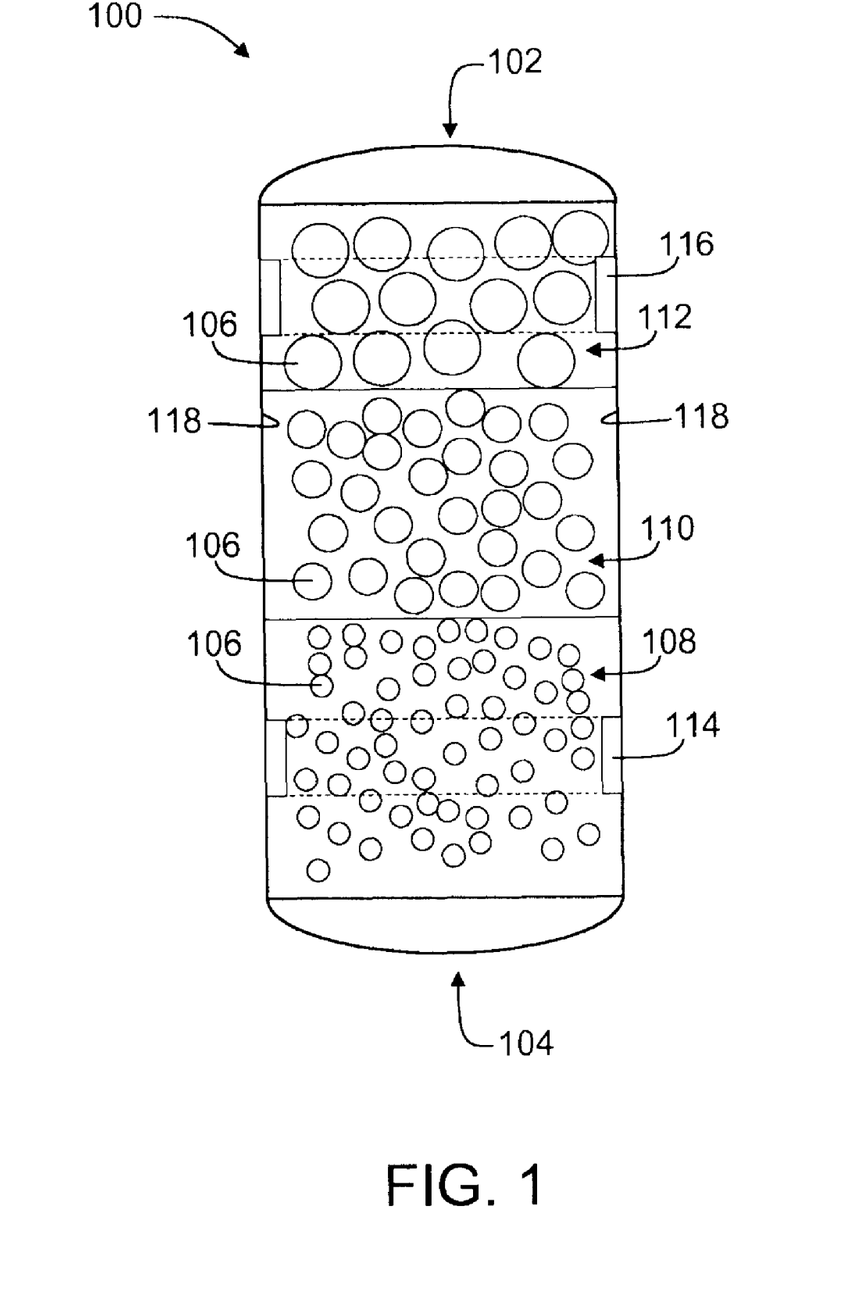
FIG. 1 is a schematic diagram of an exemplary adsorption column including baffles and in a layered adsorbent configuration.
Figure 2:
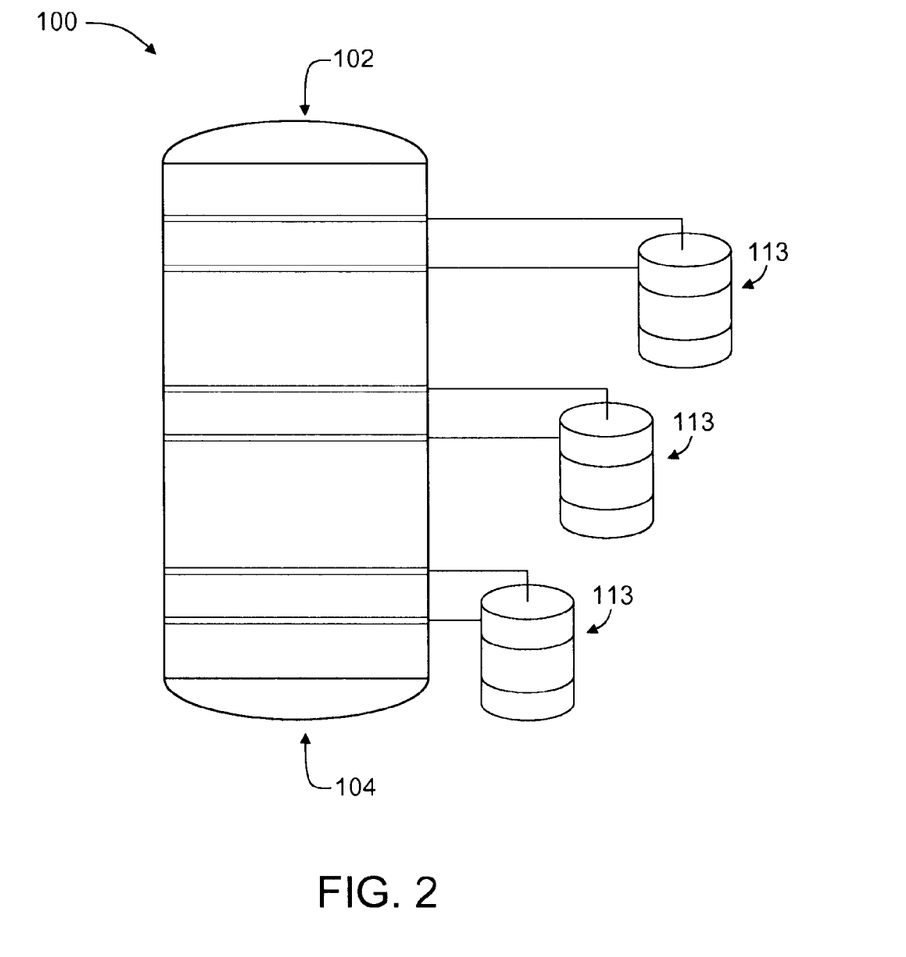
FIG. 2 is a schematic diagram of an exemplary adsorption column in a multi-stage product collection configuration.

FIG. 1 is a schematic illustration of an exemplary adsorption column 100. In the exemplary embodiment, column 100 includes a feed end 102 and an outlet end 104. Alternatively, the feed may flow from the bottom of column 100 to the top of column 100. Adsorbent particles 106 are layered in column 100 in an increasing particle size from outlet end 104 to feed end 102. More specifically, in the exemplary embodiment, the first layer 108 includes particles 106 of the largest size, a second layer 110 includes particles 106 of an intermediate size, and a third layer 112 includes particles 106 of the smallest size. Alternatively, adsorbent particles 106 may be arranged in any number of layers that enables column 100 to function as described herein and such that the particles 106 of the largest size are arranged in a layer that is closest to feed end 102. In another embodiment, multiple columns may be used, wherein each column only contains a single particle size range. In yet another embodiment, a combination of columns that contain a single particle size range and/or columns that contain layered particles of different size ranges may be used. Additionally, a combination of columns operated in parallel may be used to reduce operating pressures, or a series-parallel column configuration may be used to improve yield. Moreover, product may be removed from column 100 at one or more intermediate stages and directed to storage tanks 113, as shown in FIG. 2.

The adsorbent particles 106 may be of any kind that has the necessary adsorption capacity for vanadium and nickel containing compounds. One such adsorbent is an inorganic silica adsorbent material—usually in particle form. As used herein, the term "silica" can refer to silica gels, fumed silicas, or precipitated silicas. The silica may be in a hydrogel or an xerogel form. The average particle size (diameter) of the silica particles is usually in the range of about 5 microns to about 100 microns, depending on the commercial grade of the silica. Silica materials with specific physical characteristics such as surface area, pore volume, and/or average pore size, are effective for removing impurities from fuel or oils. The primary characteristics relate to surface area, pore volume, average pore size, and average particle size. Another important characteristic of such particles is the "cumulative pore volume distribution" of the adsorbent particles.

Generally, a total surface area of the silica adsorbent particles is at least about 15 $m^2/g$, based on the Brunauer-Emmett-Teller (BET) measurement technique. In some specific embodiments, the total surface area of the particles is between at least about 200 $m^2/g$ and about 1200 $m^2/g$.

A pore volume quality of the silica adsorbent particles represents the total interior volume of the particles. The pore volume (total) is usually at least about 0.5 cc/g, based on the Barrett-Joyner-Halenda (BJH) pore volume measurement technique. In some embodiments, the total pore volume is at least about 1.0 cc/g. The total pore volume is given by the sum of the pore volumes of all adsorbent particles over the entire pore size range present in the adsorbent sample. In the exemplary embodiment, the total pore volume is between about 0.9 cc/g and about 2.0 cc/g.

The silica adsorbent particles can be further characterized by pore size, i.e., pore diameter. Usually, adsorbent silica materials that provide a mesoporous surface, or a combination of mesoporous and microporous surfaces, can be used. The selected pore size depends on various factors, such as the particular type of silica used, the specific type of oil being treated, the impurities initially present in the oil, the size and wetting characteristics of the impurities, and/or the chemical nature of the impurities, e.g., whether such impurities are polar or non-polar. In one embodiment, the adsorbent materials have an average pore size of less than about 60 nm. In another embodiment, the average pore size is less than about 10 nm. The average pore size of the adsorbent materials is in the range of about 3 nm to about 100 nm.

The cumulative pore volume distribution can be obtained from the total cumulative pore volume, which in turn can be obtained from the total pore volume. It should also be understood that in the exemplary embodiment, substantially all of the silica particles in a batch contain at least some pores, and the silica adsorbent material has a cumulative pore volume distribution of at least about 20% of particles having a pore diameter in the range of about 3 nm to about 20 nm. Stated otherwise, in the exemplary embodiment, at least about 20% of the pores, i.e., the total number of pores in all of the particles, have a pore diameter within this range. Other factors that may influence the selection of a desired pore volume distribution for the silica, include, but are not limited to, the type and/or shape of the impurity.

Any silica adsorbent materials that enable column 100 to function as described herein may be used, provided such materials are sufficiently robust, so that the pore structure of the silica will not collapse or degenerate when contacted with various polar and nonpolar solvents, e.g., during a slurrying or regeneration step. Some examples of suitable adsorbents include, but are not limited to only including, those available from PQ Corporation, such as Britesorb® C930, C935, D350 EL, D300 CE, A100, and R100. In the exemplary embodiment, the adsorbent particles packed within column 100 are either Britesorb® C935 or Britesorb® D350 EL absorbents and have a particle size distribution such that at least 50% of the particles are greater than about 18 microns.

In addition, in the exemplary embodiment, column 100 includes a first and a second baffle 114 and 116, respectively, that are each coupled to an interior wall 118 of column 100. More specifically, in the exemplary embodiment, first baffle 114 is positioned near column outlet end 104 and second baffle 116 is positioned near column feed end 102. Alternatively, any number of baffles may be used within column 100. In the exemplary embodiment, first and second baffles 114 and 116 are fabricated from Tygon® tubing. Alternatively, first and second baffles 114 and 116 may be formed from any material that facilitates preventing channeling within adsorption column 100. Channeling occurs, often near the column walls, when voids are formed in the adsorbent layers and a portion of the feed entering column 100 channels through the voids at a faster velocity than the average velocity of the solvent flowing through column 100. Consequently, a portion of the adsorbent is under-utilized and the overall capacity of column 100 is adversely affected. In the exemplary embodiment, first and second baffles 114 and 116 facilitate preventing channeling of the feed stream within column 100. Specifically, as oil flows through column 100, if a channeling effect starts to develop, first and second baffles 114 and 116 substantially slow the flow and act as a barrier until the remaining portions of the oil front catches-up in a self-correcting action.

In operation, first, second, and third sections of adsorbent particles 108, 110, and 112, respectively, are slurried with a solvent to pretreat the adsorbent particles. In the exemplary embodiment, the solvent is petroleum ether. Alternatively, the solvent may be any combination of pentane, hexane, heptane, and/or isomers thereof. Those skilled in the art should understand that some types of petroleum ether are referred to as "benzene" or "X4", and are used as a mixture of hydrocarbon, non-polar solvents. Petroleum ether can be obtained from petroleum refineries as that portion of the distillate which is intermediate between the lighter naphtha and the heavier kerosene. It typically has a specific gravity between about 0.6 and 0.8 and a boiling range of about 30° C. to about 60° C., depending on the particular grade.

Each section 108, 110, and 112 is packed into column 100 one layer at a time, such that the section being inserted into column 100 is allowed to settle before the next is added. One method for obtaining uniform layers of particles is to sieve the adsorbents before loading them into column 100. Column 100 may be contacted or tapped to release any air bubbles that may be present within the slurry. After a sufficient amount of time has elapsed, the next section 108, 110, or 112 is packed into column 100, resulting in a discrete stacked formation. In one embodiment, petroleum ether is recirculated through column 100 to facilitate increasing the packing density of the particles 106. In the exemplary embodiment, the overall density of the adsorbent particles 106 in column 100 is between about 0.25 g/cc and about 0.3 g/cc. By using a layered configuration within column 100, better contaminant removal and a lower operating pressure are facilitated as compared to a homogeneously prepared column.

In an alternative embodiment, the adsorbent particles 106 are dried, prior to contact with the solvent. Drying can be carried out by various techniques. For example, the adsorbent can be heated to temperatures of between about 80° C. to about 250° C., under vacuum, to facilitate the removal of surface moisture.

After drying, the fuel or oil is then diluted with a solvent in a ratio of about 1:1 to about 10:1 of solvent to oil. For example, the fuel or oil may be, but is not limited to, Saudi light, Saudi heavy, Arabian super light, Arabian extra light, gas condensate, Arabian light, Arabian medium, Banoco, Arabian heavy, Berri extra light, Abqaiq extra light, marjan Arabian medium, sulif Arabian, medium Chilean crude oil, Brazilian crude oil, and products derived by blending and/or processing thereof. In the exemplary embodiment, petroleum ether is used as the solvent. Alternatively, the solvent may be any combination of pentane, hexane, heptane, or isomers thereof. By diluting the oil with the solvent, the viscosity of the resulting mixture is lower than that of pure oil. More specifically, and for example, the viscosity of petroleum ether and Saudi heavy oil are 0.00024 Pa s and 0.03921 Pa s, respectively. The viscosities of the mixtures having about a 1:1 ratio and about a 10:1 ratio of petroleum ether to Saudi heavy oil are approximately 0.00307 Pa s and 0.00038 Pa s, respectively, at room temperature. By reducing the viscosity of the resulting mixture, prior to the mixture being fed to column 100, the pressure throughout column 100 is reduced, and mass transfer limitations on adsorption are reduced. Moreover, it has been determined that the dilution of the oil facilitates column 100 achieving the desired adsorption and impurity removal.

In one embodiment, to facilitate removing asphaltenes and high molecular weight residues, resins, and bitumen from the solvent and oil mixture, the solvent and oil mixture is centrifuged prior to being supplied to column 100. Removal of the asphaltenes is beneficial when a continuous process is being employed to treat the fuel or oil, as the process facilitates minimizing a build-up of pressure in columns, which can otherwise result from the presence of the heavy fractions. Moreover, by centrifuging the mixture and removing the asphaltenes, a substantially particulate-free feed stream can be obtained, that facilitates preventing pressure increases and impeded flow within column 100.

The solvent and oil mixture is directed into the feed end 102 of column 100. In the exemplary embodiment, the feed makes a single pass through column 100 containing discrete layers 108, 110, and 112 of adsorbent particles at a flow rate sufficient to remove impurities. Most commonly, in the exemplary embodiment, a flow rate corresponding to approximately 10 to 20 minutes of residence time is used. Faster flows are possible, but flow rates may be limited by pressures generated within column 100. As previously noted, in another embodiment, multiple columns in series may be used. When columns in series are used, a first column can remain in service until completely saturated, after which a second column becomes the first and a new, i.e., a third, column becomes the second. In another embodiment, columns may be oriented in parallel to facilitate managing overall size and pressures of the columns.

After purification, in the exemplary embodiment, the resulting oil is analyzed for impurities, such as vanadium and nickel, normally present as organo-metallic compounds, by the elemental analysis Inductively Coupled Plasma Emission Spectrometry (ICP). In some embodiments, the level of each of vanadium and nickel in the fuel or oil is reduced after treatment to less than about 0.2 ppm, based on the amount of metal itself. Moreover, in some embodiments, the level of sulfur (elemental sulfur) present in the fuel or oil, after treatment, is reduced by approximately 50-75%. In one embodiment, the treated fuel is then passed through a flash column to facilitate removing the solvent to be recycled.

The methods and apparatus described herein enable a supply of fuel or oil to be purified for use in an industrial setting, such as for use with a gas turbine. Specifically, using a stationary adsorbent column facilitates reducing adsorbent handling, adsorbent metering issues, and typical start-up and shut-down issues that may be encountered with other continuous processes. Further, by using a column setting, rather than a continuous mixing process, more of the adsorbent capacity is utilized. In addition, the layered packing of the adsorbent particles in the column facilitates reducing the pressure drop in the column, without sacrificing the performance of the adsorbent. Moreover, the removal of the impurities from the fuel or oil facilitates the ability to operate a gas turbine engine at a high temperature which results in a higher efficiency. The description above is meant to cover a specific example of the general process for removing impurities from a fuel or oil and should not be found limited to the specific embodiments described.

Exemplary embodiments of adsorption columns and the removal of impurities from heavy fuel as associated with industrial facilities are described above in detail. The methods and systems are not limited to the specific embodiments described herein nor to the specific illustrated adsorption column, but rather, steps of the method and/or components of the system may be utilized independently and separately from other steps and/or components described herein. Further, the described method steps and/or system components can also be defined in, or used in combination with, other methods and/or systems, and are not limited to practice with only the method and system described herein. The description above is meant to cover a specific example of the general process for removing impurities from fuel or oil to provide a cost effective source of fuel and as such, improve the efficiencies within an industrial plant and should not be found limited to the specific embodiment described.

While the invention has been described in terms of various specific embodiments, those skilled in the art will recognize that the invention can be practiced with modification within the spirit and scope of the claims.

EXAMPLES

The examples that follow are merely illustrative, and should not be construed to be any sort of limitation on the scope of the claimed invention.

Example 1

Homogeneously Packed Britesorb C-935

Initially, two adsorption columns, operated in series, were packed with 8.0 grams of silica xerogel adsorbent, Britesorb C-935. The column feed was prepared by mixing petroleum ether and Saudi crude oil in a 4:1 ratio of petroleum ether to Saudi crude oil. The feed mixture was blended and the resulting mixture was centrifuged to remove precipitate containing asphaltenes and other non-soluble species. The precipitate was approximately 14 wt. % of the original oil. The bulk Saudi crude oil, prior to being mixed with petroleum ether, contained about 58.4 ppm vanadium as analyzed by ICP/MS. After the precipitate was removed, the feed mixture of petroleum ether and Saudi crude oil contained about 2.9 ppm vanadium.

Feed to the column was pumped with a peristaltic pump at a desired flow rate. The adsorbent was pretreated with petroleum ether, and the feed stream was fed to the column and samples were taken at predetermined time intervals. Samples were analyzed by ICP/MS elemental analysis to determine the concentration of vanadium.

Figure 3:
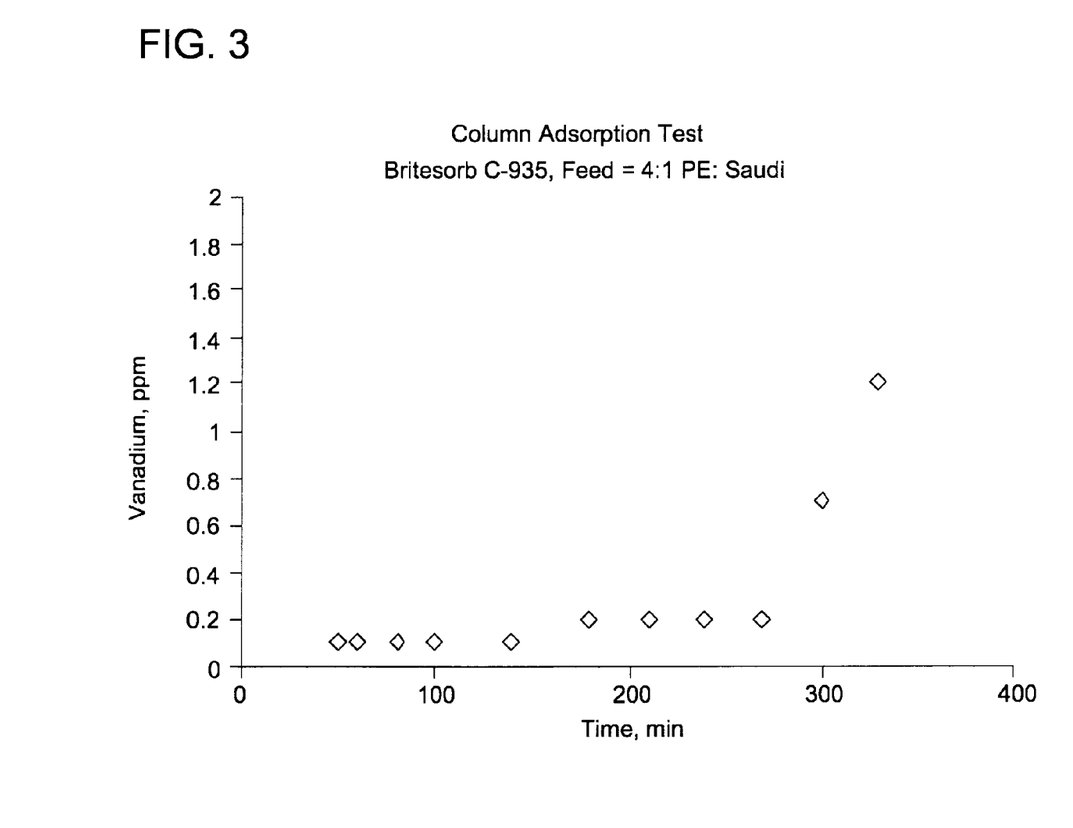
FIG. 3 is a chart illustrating an exemplary vanadium concentration in a product over time.

A chart illustrating the exemplary vanadium concentration in the product over time is set forth in FIG. 3. Throughout most of the experiment, the vanadium concentration was reduced to less than 0.2 ppm. The column was determined to be in break-through mode in which the product was no longer in spec, i.e. vanadium was greater than 0.2 ppm, after approximately 300 minutes of operation and the test was stopped.

Example 2

Homogeneously Packed Britesorb D-350 EL

In this experiment, an adsorption column was packed with 4.0 grams of silica xerogel adsorbent, Britesorb D-350 EL. The feed was prepared by mixing petroleum ether and Saudi crude oil in a 2:1 ratio of petroleum ether to Saudi crude oil. The feed mixture was blended and the resulting mixture was centrifuged to remove precipitate containing asphaltenes and other non-soluble species. The precipitate was approximately 12 wt. % of the original oil. The original bulk Saudi crude oil contained about 58.4 ppm vanadium as analyzed by ICP elemental analysis. After the precipitate was removed, the feed mixture of petroleum ether and Saudi crude oil contained about 4.7 ppm vanadium.

Feed to the column was pumped with a peristaltic pump and the adsorbent was pretreated with petroleum ether. Feed was fed to the column and samples were taken at predetermined intervals. The samples were analyzed by ICP/MS elemental analysis to determine the concentration of vanadium.

Figure 4:
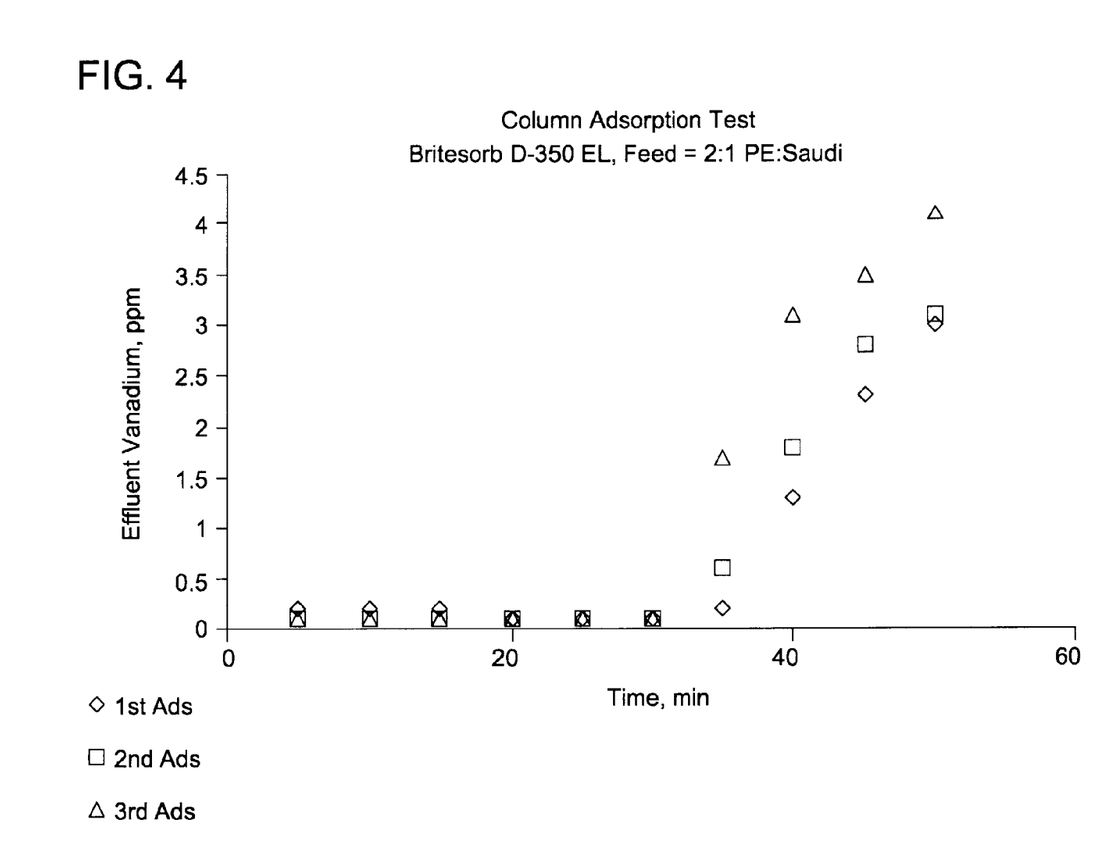
FIG. 4 is a chart illustrating an exemplary vanadium concentration in a product over time.

A chart illustrating the vanadium concentration in the product over time is set forth in FIG. 4. Throughout most of the experiment, the vanadium concentration was reduced to less than 0.2 ppm. The column was determined to be breaking through after approximately 40 minutes of operation, and the test was stopped. The adsorbent for this test was regenerated by removing the adsorbent from the column and was extracted in a Soxhlet apparatus overnight with a solvent mixture of 30 wt % ethyl acetate and 70 wt % cyclohexane. The adsorption and regeneration was repeated two more times with similar results. The results are illustrated in FIG. 4.

Example 3

One Inch Column Tests

For this experiment, a peristaltic pump was used to deliver an oil and petroleum ether mixture to a one inch inner diameter column. Scales were used to observe feed and product weights over time.

A bottom extender plunger was inserted in the column and Britesorb® adsorbent that had been dried in a vacuum overnight was weighed and dry loaded into the top of the column. The top extender was secured in place and petroleum ether was pumped through the column from the bottom up. Petroleum ether was then recirculated and the pump was stopped after the adsorbent was fully wetted and reached equilibrium. The column was tapped along the sides to enable trapped air bubbles to rise to the top of the column.

Due to the difficulty of wetting the adsorbent with the petroleum ether, the above process was altered by adding the adsorbent in the form of a petroleum ether slurry. To form the slurry, the adsorbent was added to a two liter plastic vessel. Petroleum ether was then added to the vessel. The mixture was swirled and mixed with a spatula to ensure full wetting of the adsorbent. The adsorbent-petroleum ether slurry mixture was then poured into the top of the column through a funnel, and the top extender plunger was put in place and secured.

Next, the crude oil feed solution was prepared. The first step in feed preparation was the deasphalting step. The asphaltene fraction is typically the least soluble, highest molecular weight, and most aromatic fraction of crude oil. Asphaltenes also contain a majority of the vanadium containing components. More specifically, the asphaltenes contain between about 50-80% of the vanadium containing components. The asphaltene fraction is precipitated with the addition of solvent such as petroleum ether. Petroleum ether was added to crude oil in petroleum ether to crude oil ratios ranging from 2:1 to 4:1 by weight. The mixture was hand-shaken and was then centrifuged. The deasphalted crude oil was decanted leaving behind the asphaltene residue. The amount of asphaltenes that precipitated was dependent on the specific crude oil as well as the petroleum ether to crude oil ratio and was generally between about 5-15 wt. % relative to the weight of the starting crude oil. Tubing was pushed through a small hole in the top of the feed vessel and fed to the bottom. The cap was secured to minimize the loss of volatiles. The pump flow was set to the desired flow rate and deasphalted feed was pumped to the column, usually from the top of the column down.

The oil feed progressed to the top of the column and upon entering the column, the timer was started. During the first several one inch column experiments, considerable channeling was observed. Channeling occurs when voids are formed in the adsorbent, often on the walls of the column, and a portion of the feed channels through faster than the average velocity of the solvent front. Consequently, a portion of the adsorbent is under-utilized and capacity suffers.

In addition to flow orientation, other variables tested to eliminate channeling included: the method of packing the column bed, the amount of time pumping petroleum ether to equilibrate the column, the rate of flow and pressure during equilibration, the method of cleaning the column prior to adsorption, various means of vibrating and packing the adsorbent, means of adding adsorbent, e.g. through a funnel with a long thin stem to minimize air bubbles during adsorbent slurry addition, etc. None of these attempts were successful at eliminating channeling.

One effective variable, however, was the addition of baffles to the inside of the column. Controlling the flow along the outer edges of the column was accomplished by coupling baffles on the inside of the column wall. Once the baffles were installed into the column, an adsorption experiment was run. The feed progressed in an even fashion through the column utilizing all the adsorbent. Capacity was maximized and channeling was eliminated.

Additionally, if there appeared to be an onset of channeling as crude oil feed moved through the column, the baffle acted as a barrier until the remaining portions of the oil front caught-up, thus exhibiting a self-correcting action. Initially, five baffles were used in the first successful test. Two baffles were used in later tests without issue. A first baffle was placed near the top of the column, and a second baffle was placed near the bottom of the column.

Example 3

One Inch Column Tests Using a Graduated Bed Arrangement

For this experiment, a peristaltic pump was used to deliver a crude oil and petroleum ether mixture to the top of a column comprising three discrete particle size layers packed therein.

The column was first loaded with Britesorb C-935® adsorbent according to the following procedure: 5 grams of Britesorb® comprising particles of average diameter of greater than about 75 microns was slurried with petroleum ether, poured into the column using a funnel, and allowed to settle until an equilibrium height was achieved. Ten grams of Britesorb® with average particle size of between about 75 microns and about 106 microns was slurried with petroleum ether and poured into the column on top of the first section, and allowed to settle. Finally, 15 grams of Britesorb® with average particle size between about 106 microns and about 150 microns was slurried with petroleum ether and added to the column, creating a bed with three discrete size layers. Petroleum ether was then circulated through the column using a peristaltic pump until the column as a whole settled to an equilibrium height of about 8 inches.

A petroleum ether to Saudi light crude oil ratio of about 2:1 was used for the oil feed. The feed was introduced to the top of the column at a flow rate of about 5 cc/min using a peristaltic pump. A timer was started when the oil first reached the top of the adsorbent, and product samples were taken at pre-determined intervals. Samples were analyzed using ICP-MS to determine the vanadium concentration. Throughout most of the experiment, the vanadium concentration in the product remained below 0.2 ppm. The column was determined to be saturated after about 140 minutes of operation and the test was stopped. The pressure in the column was also measured at pre-determined intervals throughout the test. Results indicate that a column arranged with discrete layers of different particle sizes graduated from large to small from inlet to outlet takes longer to reach breakthrough and suffers less pressure buildup than a column using the same mix of particle sizes in a homogeneous packing arrangement. The results are illustrated in Chart 3 below.

CHART 3

| Pressure Drop (psi) and Mass Collected (grams) | | |
| --- | --- | --- |
| Bed Description | max ΔP (psi) | Mass collected (grams) (0.2 ppm V) |
| 30 g C-935, heavy oil, graduated bed | 7.5 | 146 |
| 30 g C-935, heavy oil, mixed | 7.9 | 134 |
| 30 g C-935, light oil, graduated bed | 4.2 | 141 |
| 30 g C-935, light oil, mixed | 6.25 | 136 |

What is claimed is:

1. A method of removing impurities from heavy fuel, said method comprising:
   providing a first stationary adsorption column;
   packing adsorbent particles that have a particle size distribution in a graduated particle orientation such that the smallest particles are positioned closest to an outlet end of the first column and such that the largest particles are positioned closest to a feed end of the first column, wherein at least about 50% of said particles have a diameter greater than about 18 microns into the first column;
   diluting heavy fuel with a solvent to form a solvent-fuel mixture; and
   supplying the solvent-fuel mixture through the first column to facilitate removing impurities from the mixture, wherein the impurities comprise a metal.

2. A method in accordance with claim 1 wherein packing the particles in the first column further comprises orienting the particles in at least three discrete layers by packing a first discrete layer of particles with particles having an average particle size of less than about 38 micrometers, packing a second discrete layer with particles having an average particle size of about 53 micrometers to about 75 micrometers on top of the first discrete layer, and packing a third discrete layer of particles having an average particle size of about 106 micrometers to about 425 micrometers on top of the second discrete layer.

3. A method in accordance with claim 1 further comprising:
   slurrying the particles with the solvent prior to packing the particles in the first column;
   circulating the solvent through the particles;
   removing any excess air trapped within the first column; and
   removing a product from the first column at one or more intermediate stages of the first column.

4. A method in accordance with claim 1, wherein providing a first stationary adsorption column further comprises providing a second adsorption column in a parallel or series-parallel relationship with the first stationary adsorption column.

5. A method in accordance with claim 1 further comprising inserting at least two baffles within the column.

6. A method in accordance with claim 1 further comprising directing the solvent-fuel mixture through the column such that the residence time of the mixture is between about 10 and 20 minutes.

7. A method in accordance with claim 1 further comprising removing a product from the first column from at least one intermediate stage.

8. A method for removing impurities from heavy fuel comprising:
   providing a first stationary adsorption column;
   packing a plurality of adsorbent particles in the first column in a graduated particle orientation such that the smallest particles are positioned at an outlet end of the first column and the largest particles are positioned at a feed end of the first column;

diluting heavy fuel with a solvent to form a solvent-fuel mixture; and directing the solvent-fuel mixture through the first column to facilitate removing impurities from the mixture, wherein the impurities comprise a metal.

9. A method in accordance with claim 8, wherein packing a plurality of adsorbent particles in the first column further comprises layering the particles in at least two discrete sections.

10. A method in accordance with claim 8, wherein packing a plurality of adsorbent particles in the first column further comprises layering said particles in at least three discrete sections by packing a first discrete layer of particles with particles having an average particle size of less than about 38 micrometers, packing a second discrete layer with particles having an average particle size of about 53 micrometers to about 75 micrometers on top of the first discrete layer, and packing a third discrete layer of particles having an average particle size of about 106 micrometers to about 425 micrometers on top of the second discrete layer.

11. A method in accordance with claim 8 further comprising slurrying the particles with the solvent prior to packing the particles in the first column and directing the solvent-fuel mixture through the first column such that the residence time of the solvent-fuel mixture is between about 10 and 20 minutes.

12. A method in accordance with claim 8 further comprising inserting at least two baffles within the first column.

13. A method in accordance with claim 8, wherein providing a first stationary adsorption column further comprises providing a second adsorption column in a parallel or series-parallel relationship with the first stationary adsorption column.

14. A method in accordance with claim 8 further comprising removing a product from the first column from at least one intermediate stage.

* * * * *